Figure 1:
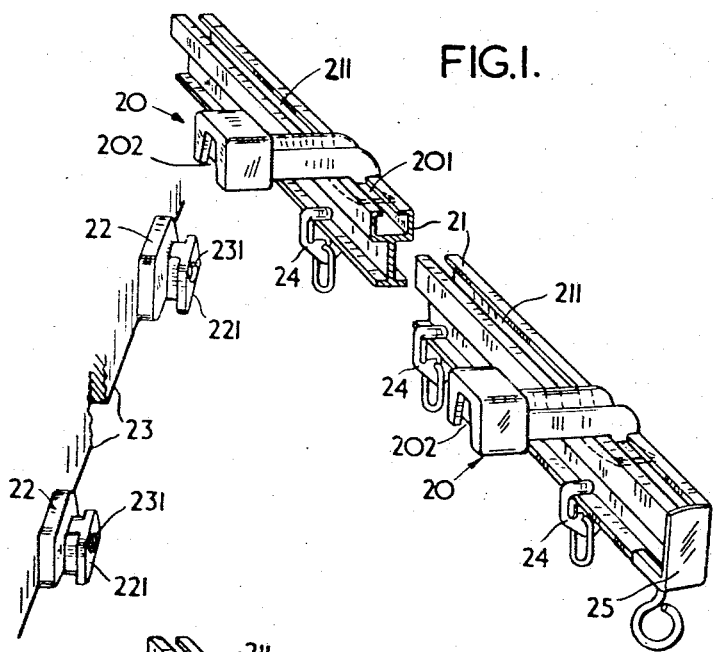

Oct. 10, 1967 R. W. HANKIN 3,346,227
CURTAIN SUSPENSION DEVICES
Original Filed Sept. 5, 1963 8 Sheets-Sheet 1

INVENTOR
ROBERT WILLIAM HANKIN
BY
Kenway, Jenney & Hildreth
ATTORNEYS

Oct. 10, 1967     R. W. HANKIN     3,346,227
CURTAIN SUSPENSION DEVICES

Original Filed Sept. 5, 1963     8 Sheets-Sheet 2

INVENTOR
ROBERT WILLIAM HANKIN
BY
ATTORNEYS

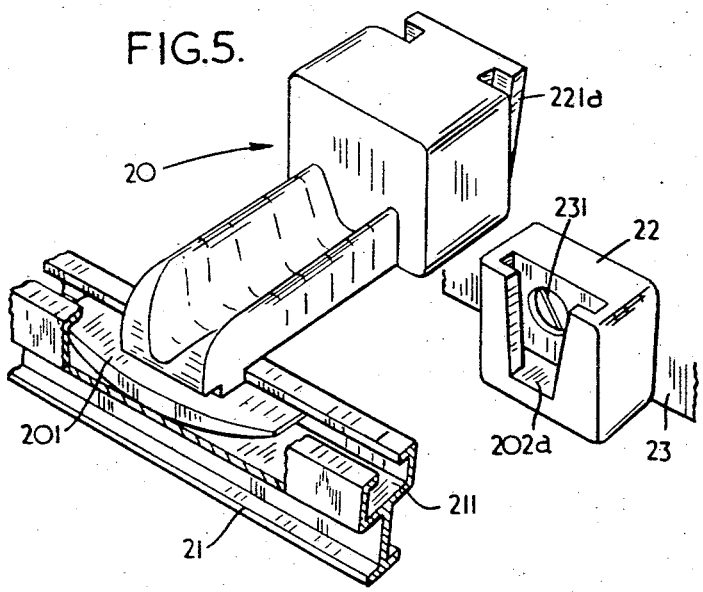
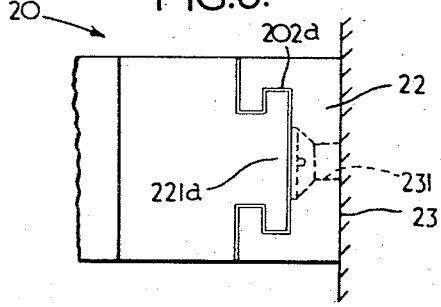

Oct. 10, 1967  R. W. HANKIN  3,346,227
CURTAIN SUSPENSION DEVICES

Original Filed Sept. 5, 1963  8 Sheets-Sheet 4

INVENTOR
ROBERT WILLIAM HANKIN
BY
*Kenway, Jenney & Hildreth*
ATTORNEYS

Oct. 10, 1967  R. W. HANKIN  3,346,227
CURTAIN SUSPENSION DEVICES
Original Filed Sept. 5, 1963  8 Sheets-Sheet 5
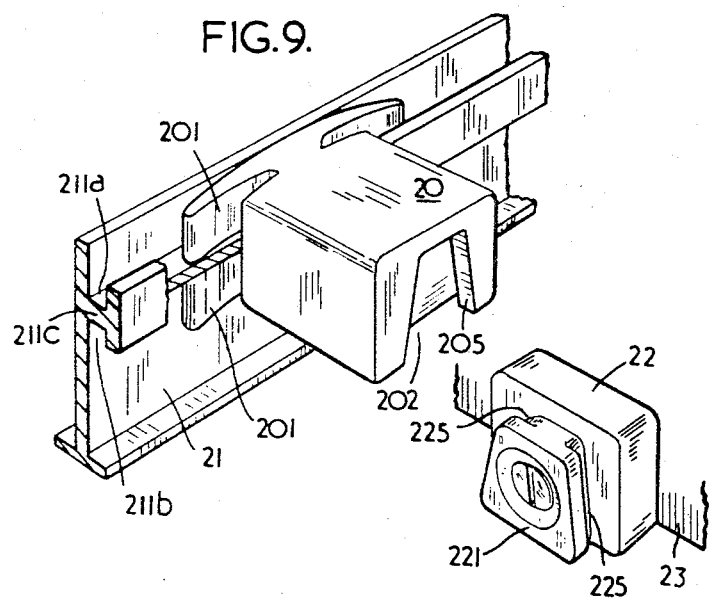
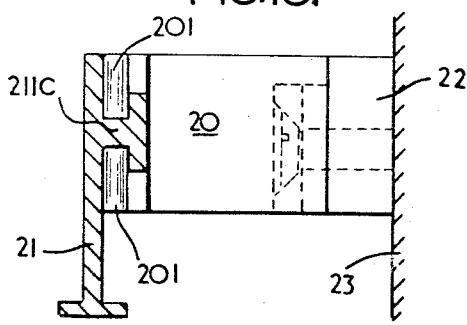
INVENTOR
ROBERT WILLIAM HANKIN
BY
ATTORNEYS Oct. 10, 1967 R. W. HANKIN 3,346,227
CURTAIN SUSPENSION DEVICES
Original Filed Sept. 5, 1963 8 Sheets-Sheet 6
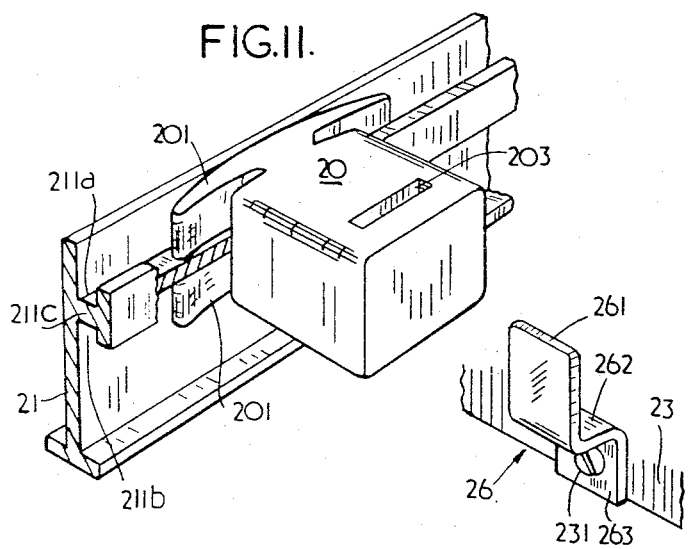
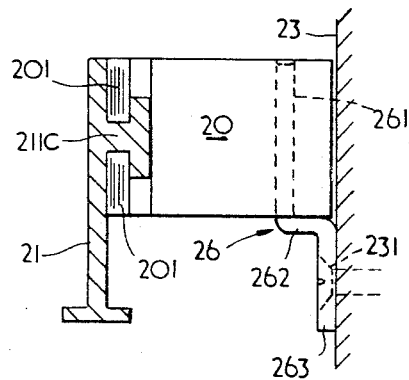
INVENTOR
ROBERT WILLIAM HANKIN
ATTORNEYS Oct. 10, 1967        R. W. HANKIN        3,346,227
CURTAIN SUSPENSION DEVICES
Original Filed Sept. 5, 1963                8 Sheets-Sheet 7

INVENTOR
ROBERT WILLIAM HANKIN
BY
ATTORNEYS

Oct. 10, 1967  R. W. HANKIN  3,346,227
CURTAIN SUSPENSION DEVICES
Original Filed Sept. 5, 1963  8 Sheets—Sheet 8
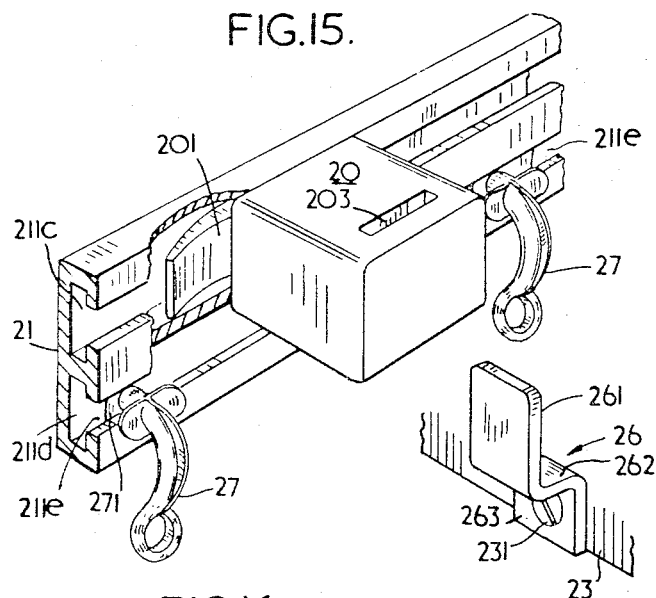
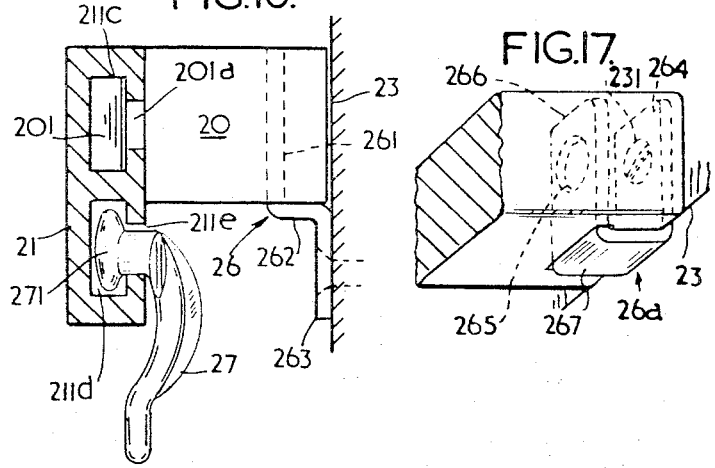
INVENTOR
ROBERT WILLIAM HANKIN
BY
ATTORNEYS

United States Patent Office 3,346,227
Patented Oct. 10, 1967

3,346,227
CURTAIN SUSPENSION DEVICES
Robert William Hankin, Streetly, England, assignor to Swish Products Limited, Tamworth, England, a corporation of Great Britain and Northern Ireland
Continuation of application Ser. No. 306,945, Sept. 5, 1963. This application Oct. 4, 1966, Ser. No. 584,245
1 Claim. (Cl. 248—262)

This application is filed as a continuation of my application Serial No. 306,945, filed September 5, 1963, now abandoned.

This invention has reference to curtain suspension devices and has for its especial object to provide a means for supporting the rails of curtain suspension devices which admits of the rail, rail supporting brackets, gliders or runners and end stops being fitted to a fixture as an assembly and removed therefrom as an assembly as and when required without involving the use of tools.

Accordingly the invention consists of a curtain suspension device incorporating attachment means adapted to be fitted permanently or semipermanently at spaced intervals to the fixture to which the curtain suspension device is required to be attached, curtain rail supporting brackets adapted to be engaged with the curtain rail and to be held fast to the curtain rail at predetermined positions therealong corresponding to the positions at which the attachment means may be fixed, said attachment means and said rail supporting brackets being provided with complementary means which permit of the rail supporting brackets being engaged with the attachment means by combined lifting on and lowering movements and of being disengaged from the attachment means aforesaid by a lifting off action thereby enabling an assembly of curtain rail, rail supporting brackets, gliders or runners and end stops being fitted to the fixed attachment means and of being removed therefrom as an assembly as may be required without involving the use of tools.

The invention also resides in means for supporting the rails of curtain suspension devices substantially as will be described hereinafter.

Embodiments of the invention will now be described with reference to the accompanying drawings which illustrate the invention as applied to curtain suspension devices utilizing a slotted or channeled rail of a synthetic plastics material and rail supporting brackets of similar material.

Figure 2:
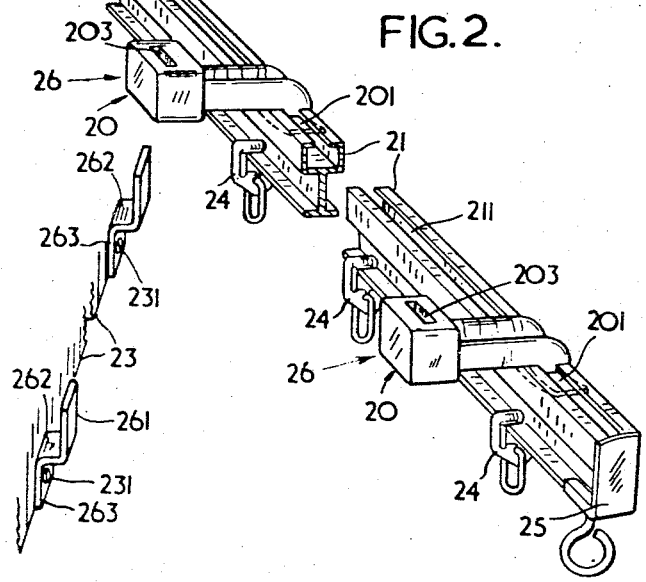

In the drawings:

FIGURE 1 is a fragmentary view in perspective showing an assembly of curtain rail, rail supporting brackets, gliders and end stops lifted as an assembly from permanent fixed attachment means for cooperation with the rail supporting brackets according to one embodiment of the invention, FIGURE 2 is a fragmentary view in perspective showing an assembly of curtain rail, rail supporting brackets, gliders and end stops lifted as an assembly from permanently fixed attachment means for cooperation with the rail supporting brackets according to an other embodiment of the invention.

Figure 3:
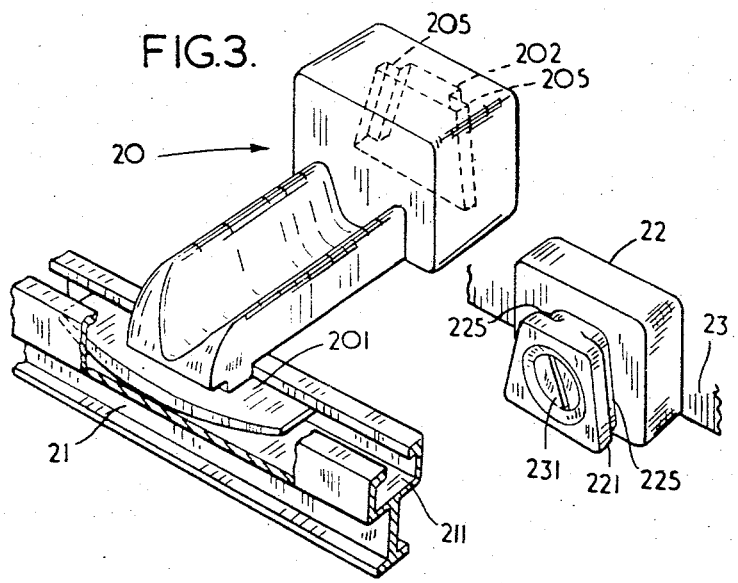
Figure 4:
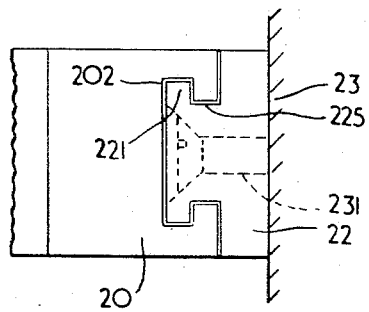

FIGURE 3 is a perspective view on an enlarged scale partly broken away illustrating the invention as applied to a curtain suspension device utilizing a curtain rail having a longitudinal slot in the head thereof with rail and rail supporting bracket assembly detached from complementary permanently fixed attachment means according to the embodiment of the invention illustrated in FIGURE 1, FIGURE 4 is a fragmentary plan view looking from the underside of the rear portion of a rail supporting bracket as depicted in FIGURE 3 engaged with the complementary permanently fixed attachment means, FIGURES 5 and 6 are complementary views to FIGURES 3 and 4 but illustrative details of an alternative to the arrangement depicted in the said FIGURES 3 and 4.

Figure 7:
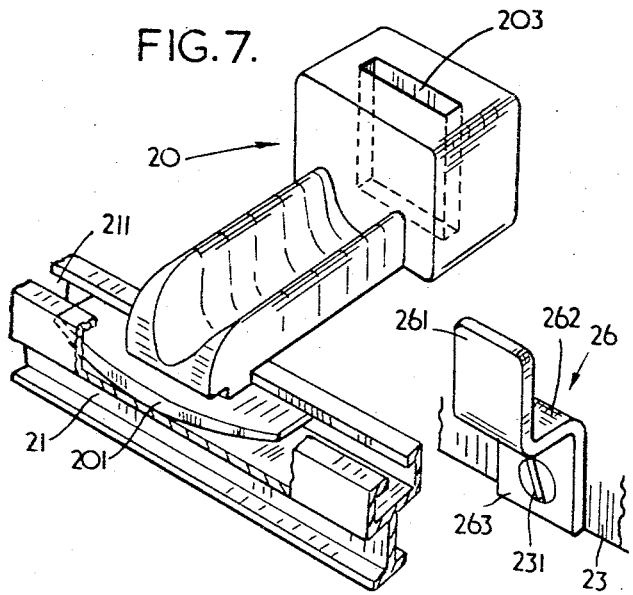
Figure 8:
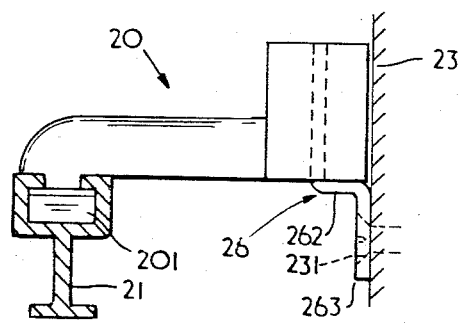
Figure 13:
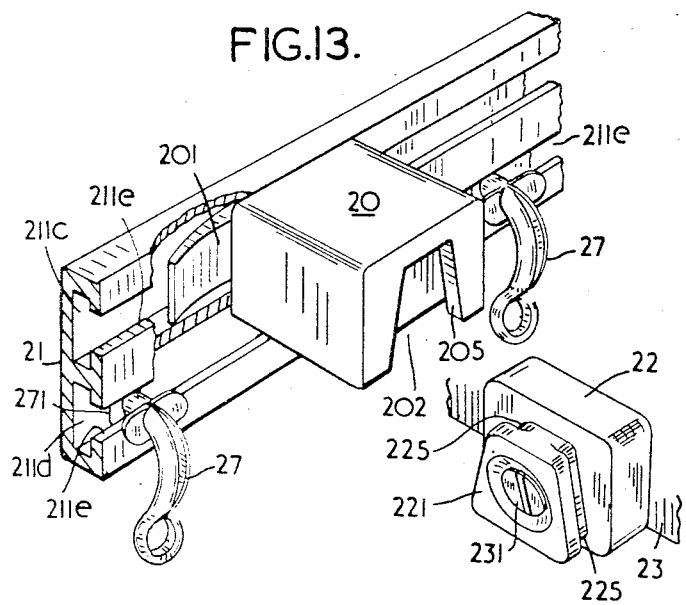
Figure 14:
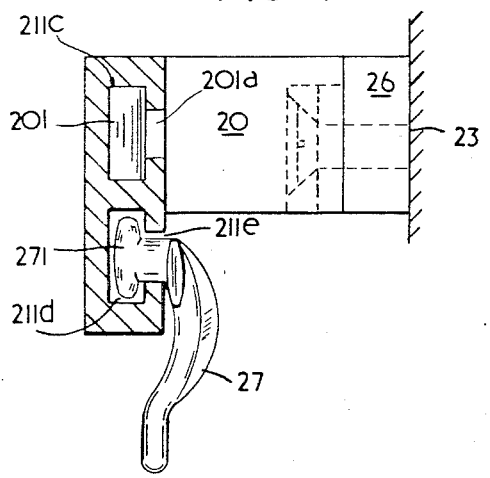

FIGURE 7 is a perspective view on an enlarged scale partly broken away illustrating the invention as applied to a curtain suspension device utilizing a curtain rail having a longitudinal slot in the head thereof with the rail and rail supporting assembly detached from permanently fixed attachment means according to the embodiment of the invention illustrated in FIGURE 2, FIGURE 8 is a view partly in elevation and partly in section of a rail supporting bracket illustrative of the embodiment of the invention as depicted in FIGURE 7 with the rail supporting bracket engaged with the complementary permanently fixed attachment means, FIGURE 9 is a perspective view on an enlarged scale partly broken away illustrating the invention as applied to a curtain suspension device utilizing a curtain rail having a longitudinal channelled section at the rear thereof with the rail and rail supporting bracket assembly detached from complementary permanently fixed attachment means according to the embodiment of the invention illustrated in FIGURE 1, FIGURE 10 is a fragmentary view partly in side elevation and partly in section illustrative of the embodiment of the invention as illustrated in FIGURE 9, FIGURE 11 is a similar view to FIGURE 9 but depicting the arrangement of FIGURE 9 according to the embodiment of the invention illustrated in FIGURE 2, FIGURE 12 is a fragmentary view partly in side elevation and partly in section illustrative of the embodiment of the invention as illustrated in FIGURE 11, FIGURE 13 is a perspective view on an enlarged scale partly broken away illustrating the invention as applied to a curtain suspension device utilizing a pair of superposed longitudinal slots which are located at the rear of the rail and which are open at the rear of the rail, with the rail and rail supporting bracket assembly detached from the complementary permanently fixed attachment means according to the embodiment of the invention illustrated in FIGURE 1, FIGURE 14 is a view partly in side elevation and partly in section illustrative of the embodiment depicted in FIGURE 13 with the rail supporting bracket engaged with the complementary permanently fixed attachment means, FIGURE 15 is a similar view to FIGURE 14 but depicting the arrangement of FIGURE 14 according to the embodiment of the invention as illustrated in FIGURE 2, FIGURE 16 is a view partly in side elevation and partly in section illustrative of the embodiment depicted in FIGURE 15 but with the rail supporting bracket engaged with the complementary permanently fixed attachment means, and FIGURE 17 is a fragmentary view illustrating in perspective and looking from the underside a modified form of the strap metal bracket as employed in the embodiments illustrated in FIGURES 2, 7, 8, 11, 12, 15 and 16.

In the drawings where desirable like numerals of reference denote similar or analogous parts in the several views.

Referring first to the general principles underlying the invention as depicted in FIGURES 1 and 2.

In the arrangement illustrated in FIGURE 1 the rail supporting brackets 20 are each provided at one end with a shoe 201 which is adapted to have a self-locking relationship with the curtain rail 21 when adjusted to a desired position therealong and at the other end a box-shaped body in which is formed a tapering vertical slot 202 adapted to fit over the tapering protuberance 221 provided at the front of an attachment block 22 permanently fixed to the wall 23 by a screw 231. The protuberance is shaped to enter and become concealed in the box-shaped body of the bracket.

The supporting brackets 20 are spaced apart and held locked on the rail 21 at intervals corresponding to the spacing of the complementary permanently fixed attachment means 22 so that the assembly of curtain rail 21 with the curtain supporting gliders 24 threaded thereon and retained thereon by end stops 25 and the rail supporting brackets 20 may be fitted as an assembly to the complementary permanently fixed attachment blocks 22 by first lifting the said assembly and then registering the tapering slots 202 with the protuberances 221 and then lowering the brackets 20 with their tapering slots 202 over the respective tapering protuberances 221. Likewise the assembly aforesaid may be detached as an assembly by disengaging the slots 202 from the protuberances 221 by a lifting off action.

In the arrangement illustrated in FIGURE 2 the rail supporting brackets 20 are each provided at one end with a shoe 201 which is adapted to have a self-locking relationship with the curtain rail 21 when adjusted to a desired position therealong and at an intermediate position with a vertical slot 205 adapted to fit over an upstanding tongue 261 at the outer end of the horizontal forwardly projecting arm 262 of a strip metal bracket denoted generically by the reference numeral 26 having a downwardly projecting arm 263 adapted to be fixed permanently in a set position to a wall 23 by means of a screw 231.

Thus an assembly, as described with reference to FIGURE 1, may be fitted to the brackets 26 by first lifting the assembly until the several slots 203 register with the respective tongues 261 and then lowering the assembly so that the tongues 261 engage within the relevant slots 203, the lowering movement being continued until the rear undersurfaces of the supporting brackets seat on the upper surfaces of the respective forwardly projecting arms 262 of the brackets 26.

Referring now to the embodiments of the invention as disclosed in greater detail in FIGURES 3 to 17.

As illustrated in FIGURES 3 and 4 each rail supporting bracket 20 is provided at the front end with a shoe 201 which is of a segmental shape in front elevation and which is capable of being engaged within the longitudinal slot 211 in the head of the rail 21 by an endwise sliding movement, said shoe 201 as is disclosed in our prior British patent specification No. 870,188 having a central thickened portion which tapers at the ends to wafer edges and which is dimensioned so that when unstressed the effective maximum thickness of the shoe 201 is fractionally greater than the depth of the longitudinal slot 211 whereby the shoe 201 becomes distorted about the wafer ends to permit of insertion in the slot 211 and after release by the manipulator when the shoe 201 has been moved to a desired position in the said slot 211 assumes a self-locking relationship within the said slot 211 to retain the associated rail supporting bracket 20 in a set position relatively to the rail 21.

At the rear end each rail supporting bracket 20 is provided with an inset upwardly tapering slot 202 which is closed at the top and which is bounded by sides which are undercut as at 205.

The slots 202 are complementary to upwardly tapering protuberances 221 formed at the front of attachment blocks 22 which are adapted to be screwed permanently to the wall 23 at predetermined set intervals and which like the rail supporting brackets 20 are made of nylon, said protuberances being undercut as at 225.

In the alternative arrangement to that depicted in FIGURES 3 and 4 illustrated in FIGURES 5 and 6, each attachment block 22 is provided in the outwardly presented face thereof with a downwardly tapering slot with undercut sides and is designated by the reference numeral 202a whilst the complementary downwardly tapering protuberance with undercut sides designated by the reference numeral 221a is formed at the rear end of the rail supporting bracket 20.

In the arrangement illustrated in FIGURES 7 and 8 there is substituted for the attachment blocks 22 bent strip metal brackets 26 as seen on a smaller scale in FIGURE 2 whilst each rail supporting bracket 20 is provided with a vertical slot 203 for engagement with the upstanding tongue 261 at the outer end of the intermediate arm 262 of a bracket 26.

According to the embodiment of the invention as illustrated in FIGURES 9 and 10 the rail 21 is provided at the rear with superposed longitudinal channels 211a and 211b. These superposed channels 211a and 211b are adapted to have fitted therein twin self-locking shoes 201 which are carried at the outer end of each supporting bracket 20 said twin shoes 201 being adapted to straddle the common connecting web 211c of the superposed channels 211a, 211b in the manner illustrated in FIGURE 15 of our British patent specification No. 870,188. Otherwise the rail supporting brackets are adapted for fitment to permanently fixed attachment blocks 22 in the manner illustrated in FIGURES 1, 3 and 4.

The embodiment illustrated in FIGURES 11 and 12 incorporates the twin self-locking shoe arrangement of FIGURES 9 and 10 but the rail supporting brackets 20 are provided with vertical slots 203 for cooperation with the upstanding tongues 261 supporting brackets 26 as illustrated in FIGURES 2, 7 and 8.

FIGURES 13 and 14 illustrate the invention as applied to a curtain rail 21 provided at the rear with a pair of superposed longitudinal slots 211c, 211d which are each provided with a longitudinal guideway 211e. The upper slot 211c is adapted to accommodate self-locking shoes 201 carried at the outer end of rail supporting brackets 20 with the necks 201a connecting the shoes 201 to the front ends of the rail supporting brackets 20 riding in the upper longitudinal guideway 211e.

The rail supporting brackets 20 are adapted to be fitted to permanently fixed attachment blocks 22 in the manner described with reference to FIGURES 1, 3, 4, 9 and 10.

The lower longitudinal slot 211d is adapted to accommodate the head portions 271 of gliders 27.

The embodiment of the invention illustrated in FIGURES 15 and 16 is generally similar to that illustrated in FIGURES 13 and 14 with the exception that the rail supporting brackets 20 are adapted to be supported from permanently fixed brackets 26 as depicted in FIGURES 2, 7 and 8, 11 and 12.

In the modification illustrated in FIGURE 17 the strip metal bracket 26a is made of U-formation with a countersunk hole in the upstanding limb 264 for the reception of a screw 231 for securing the bracket to the wall 23 and with a registering hole 265 in the other upstanding limb 266 for permitting of the passage through the said hole 265 of the blade of a screw driver for engaging the head of the screw 231 for initial fixing purposes.

The upstanding limb 266 which contains the enlarged hole 265 is presented outwardly when the bracket 26a is screwed to the wall 23 and this limb 266 is adapted to be engaged with the complementary vertical slot 203 in the rail supporting bracket 20. When the said upstanding limb 266 is correctly engaged within the slot 203 the undersurface of the portion of the rail supporting bracket 20 within which the slot 203 is formed is adapted to seat on the bridging limb 267 of the bracket 26a.

If desired the rail supporting bracket 20 may be adapted to have valance rail supporting means fitted thereto so that the whole assembly of curtain rail, rail supporting brackets and valance rail supporting means may be fitted and detached as an assembly as and when required.

Further if desired in the arrangements according to the embodiment illustrated in FIGURES 1, 3, 4, 5, 6, 9, 10, 13 and 14, the protuberances 221, 221a may be parallel sided instead of tapered and likewise the slots 202, 202a.

Furthermore it will be understood that if desired the construction according to the embodiment disclosed in FIGURES 5 and 6 may be applied to the constructions according to the embodiment disclosed in FIGURES 9, 10, 13 and 14.

In this arrangement the lowering movement when fitting the assembly to the attachment blocks 22 is arrested when the closed ends of the slots 202 abut the tops of the respective protuberances 221, or the lower ends of the protuberances 221a abut the closed lower ends of the slots 202a as the case may be.

In another construction not illustrated the attachment blocks 22 or the rail supporting brackets 20 as the case may be, may be provided with more than one protuberance and the complementary part to coact therewith with a corresponding number of slots.

It will be appreciated that in all the embodiments described and illustrated the assembly of rail, rail supporting brackets and other components may be fitted to permanently fixed attachment means by combined lifting on and lowering movements without involving the use of tools.

It is to be understood that the invention is not limited to use with curtain rails of synthetic plastics materials or to rail supporting brackets adapted to have a self-locking association with a rail according to the invention disclosed in our prior British patent specification No. 870,188 as the invention is applicable to curtain suspension devices utilizing rails made of other materials and to curtain suspension devices utilizing other means for locking rail supporting brackets to the rail in a set position.

Furthermore it is to be understood that the expression "without involving the use of tools" is to be interpreted as excluding the use of a manner or other tapping device the use of which may be needed for effecting the detachment of a rail supporting bracket from the complementary permanently fixed attachment means.

In addition it is to be understood that the expression permanent or semipermanent fixture is to be construed as including a pelmet board or a pelmet fitting.

It may be observed further that the arrangement illustrated in FIGURES 9 and 16 provide a curtain suspension device which is particularly pleasing in that the rail supporting brackets are located at the rear of the rail and therefore largely obscured by the rail when in use.

Having thus disclosed my invention what I claim as new and desire to secure by Letters Patent is:

A curtain suspension device adapted to provide for "lift on" and "lift off" mounting and demounting of a complete curtain rail assembly without the use of tools, comprising a unitary elongated rail having parallel guideways, arranged one above the other and opening on one face of the rail, running the length thereof, a plurality of curtain supporting gliders mounted in and suspending from the lower guideway and slideable therealong, a plurality of independent self-contained attachment blocks secured to a wall at fixed horizontally spaced locations, and rail supporting brackets each mounted at one end on one of said attachment blocks and having at the other end a resilient shoe received within the upper guideway and frictionally engaged therewith to prevent free longitudinal motion of said brackets with respect to said rail, whereby said brackets may be positioned independently of the attachment blocks and held fast on said rail at spaced intervals corresponding to the fixed locations of said attachment blocks, said rail suporting brackets and said attachment blocks having complementary interengaging members separable by a vertical lifting off of the bracket from the block, whereby the assembled rail and brackets may be mounted to the attachment blocks by a lifting on and lowering motion.

References Cited

UNITED STATES PATENTS

| | | | |
|---|---|---|---|
| 606,208 | 6/1898 | Gutmann | 248—224 X |
| 1,154,847 | 9/1915 | De Vare | 248—295 |
| 1,708,857 | 4/1929 | Vandermark | 248—252 |
| 2,610,014 | 9/1952 | Ananson | 248—224 |
| 2,727,272 | 12/1955 | Hankin et al. | 248—262 X |
| 2,778,594 | 1/1957 | Boha | 248—224 X |

ROY D. FRAZIER, *Primary Examiner.*

J. F. FOSS, *Assistant Examiner.*